UNITED STATES PATENT OFFICE.

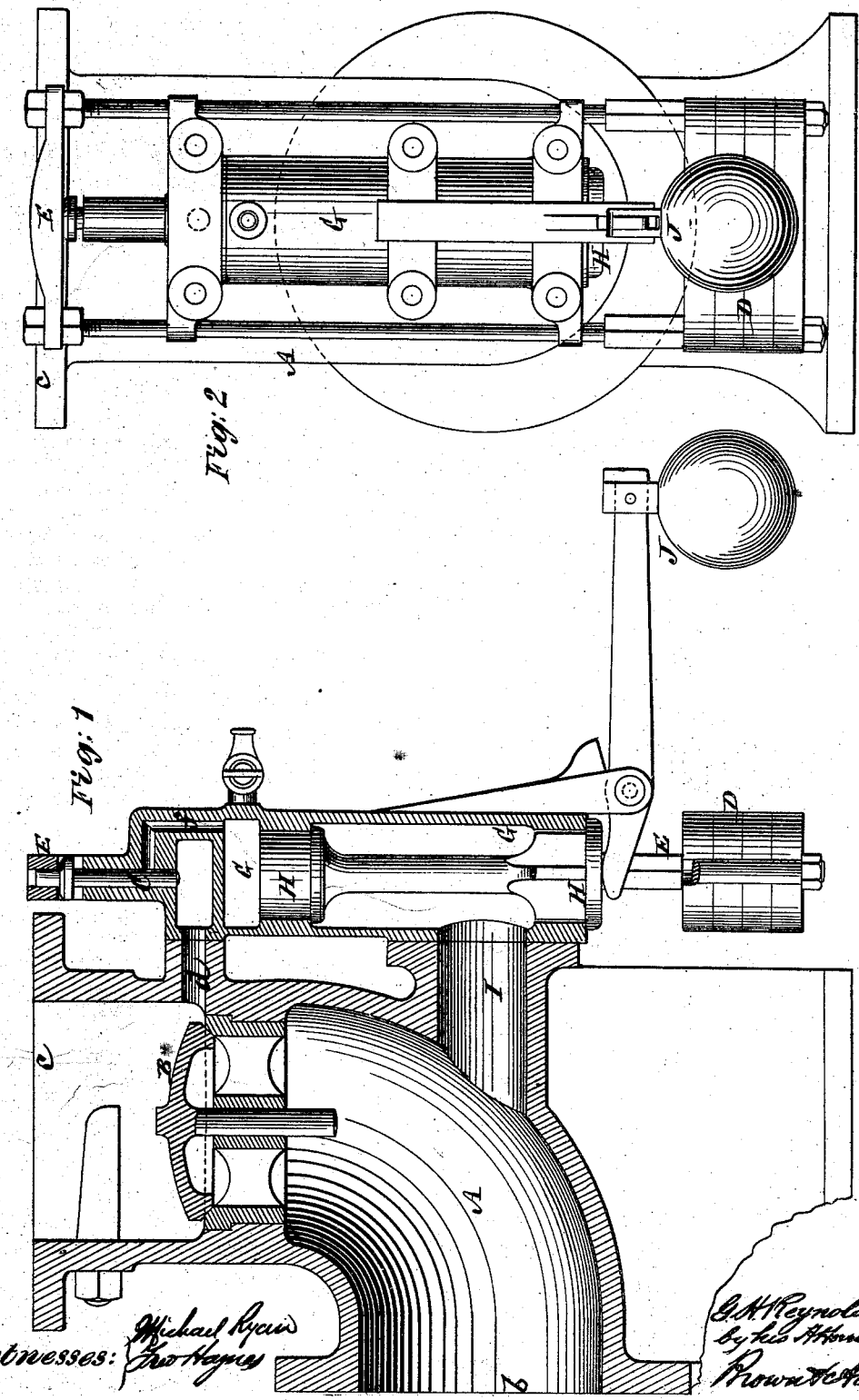

GEORGE H. REYNOLDS, OF NEW YORK, N. Y., ASSIGNOR OF ONE-HALF HIS RIGHT TO CORNELIUS H. DELAMATER AND GEORGE H. ROBINSON, OF SAME PLACE.

IMPROVEMENT IN RELIEF APPARATUS FOR AIR-COMPRESSORS.

Specification forming part of Letters Patent No. 160,956, dated March 16, 1875; application filed February 2, 1875.

*To all whom it may concern:*

Be it known that I, GEORGE H. REYNOLDS, of the city, county, and State of New York, have invented a new and useful Apparatus for Relieving Air-Compressors and their Reservoirs of Surplus or Excessive Pressure; and I do hereby declare that the following is a full, clear, and exact description of the same, reference being had to the accompanying drawing, which forms part of this specification, and in which—

Figure 1 represents a longitudinal sectional elevation of an apparatus constructed in accordance with my invention, and Fig. 2 an end elevation thereof.

This invention is more particularly designed to be applied to air-compressors which are driven by a steam-engine or other motor having other work to perform than the mere duty of operating the compressor, and in this connection the invention has the following functions, namely, the prevention of an excess of pressure in the reservoir or receiving-pipes for the compressed air without blowing off or wasting; the establishment of any given fixed pressure therein free from interference by irregularity in the work being done; and economy of the driving-power by running the compressor *in equilibrio* whenever the operating-power is in excess of what is required to produce the required compression. The invention also serves to detect leakage in the reservoir or pipes which conduct the compressed air to its place or places of use. To these ends, or certain of them, the invention consists in a novel combination of valves connected with the discharge-duct from the compressor to the reservoir or pipe or pipes receiving the compressed air; and, furthermore, connected with said reservoir or pipe or pipes, whereby the desired results are most perfectly obtained.

In the accompanying drawings, A is a pipe or duct designed to be connected at its one end, $b$, with an air-compressor, and at its other end, $c$, with the reservoir or pipe which receives the compressed air for use, as required. B is a check-valve arranged in or controlling the pipe A, and operating to allow of air being forced into the reservoir by the compressor, but preventing its return. In free communication with the reservoir or pipe A, above the valve B, is a passage, $d$, which allows of the air under compression above said valve to act on the under side of a regulating plug-valve, C. This valve C is kept closed or down to the pressure required in the reservoir either by a spring or weight, as, for instance, by weights D, connected with said valve by a yoke, E. In the performance of this duty it acts as a safety-valve, but, unlike an ordinary safety-valve, it does not, when being lifted, waste the compressed air or blow it off to the atmosphere, but simply conducts it—that is, when exceeding the required pressure—by a passage, $f$, to a valve-box, G, in which is a balanced or relief valve, H, and so that said air presses upon the upper disk or piston of the relief valve, and opens the latter by its lower disk to the atmosphere. The valve-box G is in free communication, between the heads of the valve H by a passage, I, with the duct A below the check-valve B, and said valve is lifted or closed to the atmosphere by a spring or weight, J, whenever the excess of pressure is reduced above it, the weight J being regulated to resist a given pressure.

The general operation of the apparatus is as follows: Supposing the engine or other motor, which may be kept regularly going, to have actuated the compressor till the requisite pressure has been obtained in the reservoir or receiving-pipes, then no action of the valves C H takes place, and any draft upon the reservoir, reducing the pressure therein, is compensated for by a further supply of air from the compressor through the check-valve B; but there can be no excess of pressure take place in the reservoir, inasmuch as any tendency to excess of pressure therein, whether produced by the sudden taking off of any or all of the work done, by the air from the reservoir, or otherwise, will cause the valve C, which is very sensitive, to rise and open the passage $f$, and the excess of pressure then acting upon the valve H depresses or opens the latter below to the atmosphere; also opens thereto the duct A, below the check-valve B, by means of the passage I, and the valve H remains open till the pressure in the reservoir and on the valve C is reduced to its proper limit, or, say, slightly below, when the valves C and H will close and remain closed until the pressure exceeds its proper limits again in the reservoir. When the valve H is raised to open communication between the atmosphere and the duct A, beneath the check-valve B, then the compressor works *in equilibrio*, and, beyond what is necessary to overcome friction, takes little or no power to work it, no air being then compressed. The check-valve B prevents the return or escape of air from the reservoir when the valve H is open.

In addition to the foregoing description of the general action of the apparatus and its uses, it may be observed that the apparatus also acts as a leakage-detector, inasmuch as the compressor being under regular or constant action by the motor it is only necessary to shut all regular draft from the reservoir, and then to observe the number of strokes made by the motor or by the compressor with the valve C H open or closed. Thus, if the leakage is fifty per cent., then the valves C and H will open during half the strokes of the motor and compressor in a given time; whereas, if there were no leakage at all, said valves would remain open all the time after the pressure, limited by the valve C, had been reached, provided, of course, there was no working-draft made upon the reservoir.

What I claim as new, and desire to secure by Letters Patent, is—

The combination, with the duct A, of the check-valve B, the regulating-valve C, controlled by the pressure on the delivery side of the check-valve, the relief-valve H, controlled by the regulating-valve and opening to the atmosphere, and the passage I, substantially as and for the purpose or purposes herein set forth.

GEO. H. REYNOLDS.

Witnesses:
BENJAMIN W. HOFFMAN,
MICHAEL RYAN.